US011420733B2

(12) United States Patent
Wardlaw

(10) Patent No.: US 11,420,733 B2
(45) Date of Patent: Aug. 23, 2022

(54) ADDITIVELY MANUFACTURED FLYAWAY TOOLS FOR AIRCRAFT

(71) Applicant: Textron Innovations Inc., Providence, RI (US)

(72) Inventor: Robert Patrick Wardlaw, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 131 days.

(21) Appl. No.: 16/859,074

(22) Filed: Apr. 27, 2020

(65) Prior Publication Data

US 2021/0331789 A1 Oct. 28, 2021

(51) Int. Cl.
*B64C 27/473* (2006.01)
*B64F 5/10* (2017.01)
*B64C 3/20* (2006.01)
*B33Y 80/00* (2015.01)

(52) U.S. Cl.
CPC .............. *B64C 27/473* (2013.01); *B64C 3/20* (2013.01); *B64F 5/10* (2017.01); *B33Y 80/00* (2014.12); *B64C 2027/4736* (2013.01)

(58) Field of Classification Search
CPC . B64C 27/473; B64C 3/20; B64C 2027/4736; B64F 5/10; B33Y 80/00
See application file for complete search history.

(56) References Cited

U.S. PATENT DOCUMENTS

| 9,327,458 | B2 | 5/2016 | Rugtvedt et al. |
| 9,359,060 | B2 | 6/2016 | Kajita et al. |
| 2018/0273163 | A1* | 9/2018 | Sutton ................... B64C 27/008 |
| 2019/0224939 | A1* | 7/2019 | Kooiman .................. B32B 3/08 |

* cited by examiner

*Primary Examiner* — Moshe Wilensky
(74) *Attorney, Agent, or Firm* — Lawrence Youst LLC

(57) ABSTRACT

An airfoil component assembly for an aircraft includes an additively manufactured flyaway tool including an infill support core and an interface sheet surrounding the infill support core, a spar formed from one or more layers of composite material disposed on the interface sheet of the flyaway tool and a skin formed from one or more layers of composite material disposed on the spar and the interface sheet of the flyaway tool. The flyaway tool, the spar and the skin form the airfoil component assembly for use by the aircraft in flight.

20 Claims, 12 Drawing Sheets

ADDITIVELY MANUFACTURED FLYAWAY TOOLS FOR AIRCRAFT

TECHNICAL FIELD OF THE DISCLOSURE

The present disclosure relates, in general, to the manufacturing of aircraft components and, in particular, to airfoil component assemblies such as a rotor blade or control surface including an additively manufactured flyaway tool on which one or more layers of composite material are applied.

BACKGROUND

Aircraft components may be manufactured using a wide range of manufacturing processes. For example, airfoil components such as rotor blades and control surfaces are often formed from a number of composite layers, or plies, using a layup process, which are cured to form a durable laminate. Airfoil manufacturing relies on jigs, mold lines and other assembly tools that do not form part of the final airfoil component. These traditional tooling techniques often perform poorly in iterative design processes. Iterative design is a design methodology based on a cyclic process of prototyping, testing, analyzing and refining a product or process. Based on the results of testing the most recent iteration of a design, changes and refinements are made. In the case of airfoil manufacturing, traditional tooling techniques can cost tens or hundreds of thousands of dollars for each iteration or design, making such traditional tooling techniques cost prohibitive for iterative design processes.

Modern innovations in digital design and manufacturing such as computer-aided design and additive manufacturing are aimed in part to lower the costs associated with tooling in traditional manufacturing. One example of additive manufacturing is 3D printing, in which a physical object is formed from a digital model, typically by laying down many thin layers of a material in succession. By lowering the cost and turnaround time associated with tooling in traditional manufacturing, additive manufacturing greatly enhances the iterative design process, allowing for engineers to cheaply and quickly additively manufacture a new tool for any reason such as performance failure or new constraints. Recent advances in additive manufacturing have also increased the strength of additively manufactured tooling to equal or exceed the strength of their traditionally manufactured counterparts.

A flyaway tool is designed to become part of the final manufactured product flown on an aircraft. In contrast with traditional tooling, which is typically too heavy or unwieldy to be used as an aerospace flyaway tool, additively manufactured tooling components now have the requisite high strength and low weight for viable use in flight. While additive manufacturing is used to manufacture certain aircraft components, aerospace manufacturers do not currently utilize an additively manufactured flyaway tool on which to apply more traditional manufacturing techniques such as a layup process to form an airfoil component.

SUMMARY

In a first aspect, the present disclosure is directed to an airfoil component assembly for an aircraft including an additively manufactured flyaway tool including an infill support core and an interface sheet surrounding the infill support core, a spar formed from one or more layers of composite material disposed on the interface sheet of the flyaway tool and a skin formed from one or more layers of composite material disposed on the spar and the interface sheet of the flyaway tool. The flyaway tool, the spar and the skin form the airfoil component assembly for use by the aircraft in flight.

In some embodiments, the flyaway tool may form an inner mold line tool. In certain embodiments, the flyaway tool may include a polymer or fiber-reinforced polymer. In some embodiments, the flyaway tool may be formed from a plurality of flyaway tool segments. In certain embodiments, the flyaway tool may be 3D printed. In some embodiments, the infill support core may form a polygonal or organic pattern. In certain embodiments, the interface sheet may be integral with the infill support core. In some embodiments, the spar may be disposed on a forward edge of the flyaway tool. In other embodiments, a forward edge of the flyaway tool may form a spar indentation and the spar may be disposed on the spar indentation.

In a second aspect, the present disclosure is directed to an aircraft including a fuselage and an airfoil component assembly. The airfoil component assembly includes an additively manufactured flyaway tool including an infill support core and an interface sheet surrounding the infill support core, a spar formed from one or more layers of composite material disposed on the interface sheet of the flyaway tool and a skin formed from one or more layers of composite material disposed on the spar and the interface sheet of the flyaway tool. The flyaway tool, the spar and the skin form the airfoil component assembly for use by the aircraft in flight. In some embodiments, the airfoil component assembly may be a wing, main rotor blade, tail rotor blade, horizontal stabilizer, vertical stabilizer, elevator, rudder and/or pylon.

In a third aspect, the present disclosure is directed to a method of manufacturing an airfoil component assembly for an aircraft including additively manufacturing an infill support core and an interface sheet surrounding the infill support core to form a flyaway tool; applying a spar to the interface sheet of the flyaway tool; and applying a skin to the spar and the interface sheet of the flyaway tool. The flyaway tool, the spar and the skin form the airfoil component assembly for use by the aircraft in flight.

In some embodiments, additively manufacturing the infill support core and the interface sheet may include 3D printing the infill support core and the interface sheet to form the flyaway tool. In certain embodiments, additively manufacturing the flyaway tool may include additively manufacturing flyaway tool segments and the method may include assembling the flyaway tool segments into the flyaway tool. In some embodiments, applying the spar to the interface sheet of the flyaway tool may include applying one or more layers of composite material to the interface sheet of the flyaway tool. In certain embodiments, applying the spar and the skin to the interface sheet of the flyaway tool may include applying layers of composite material to the interface sheet of the flyaway tool and the method may include curing the layers of composite material to form a laminate. In some embodiments, applying the spar and the skin to the interface sheet of the flyaway tool may include applying the spar and the skin to the interface sheet of the flyaway tool using a layup process. In certain embodiments, applying the skin to the spar and the interface sheet of the flyaway tool may include applying one or more layers of composite material to the spar and the interface sheet of the flyaway tool. In some embodiments, the method may include generatively designing the flyaway tool. In such embodiments, the generatively designed flyaway tool may include an organic infill support core. In certain embodiments, the method may include machining the airfoil component assembly including forming at least one hole through the flyaway tool and the skin.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
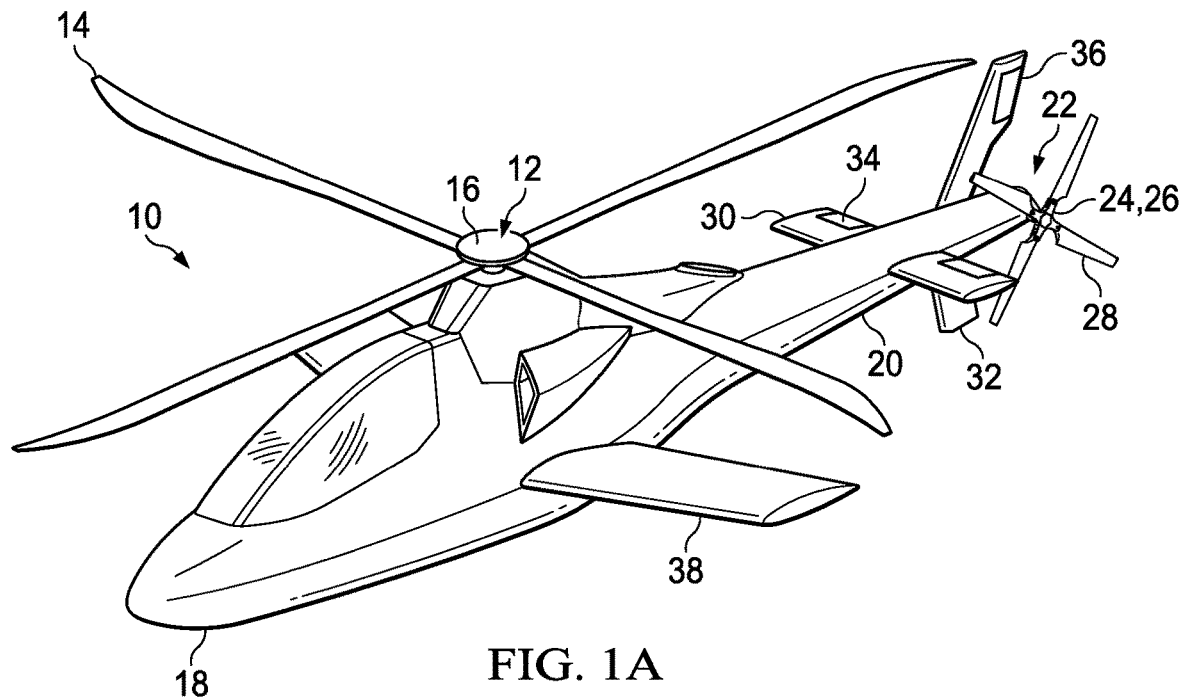
FIGS. 1A-1D are schematic illustrations of a helicopter having airfoil components formed from an additively manufactured flyaway tool in accordance with embodiments of the present disclosure.
Figure 1B:
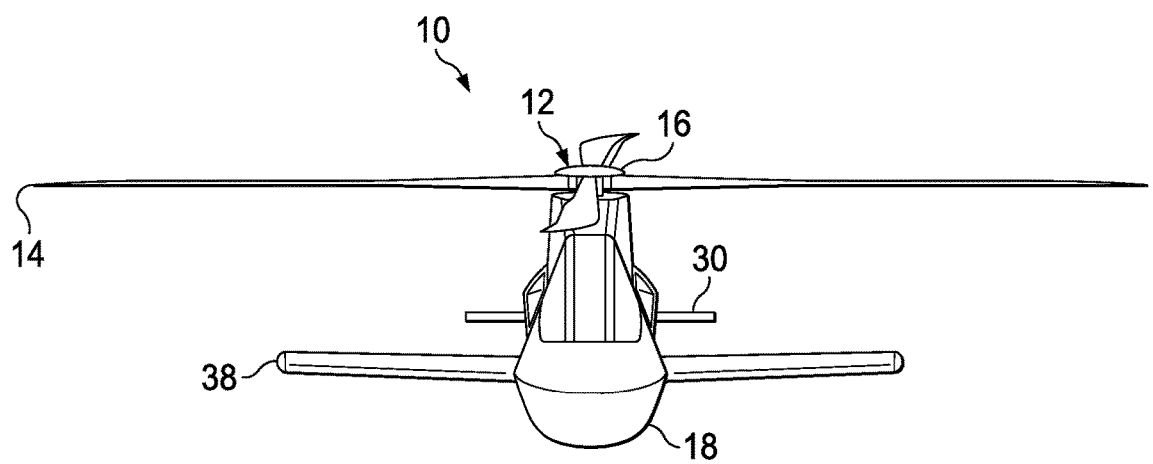
Figure 1C:
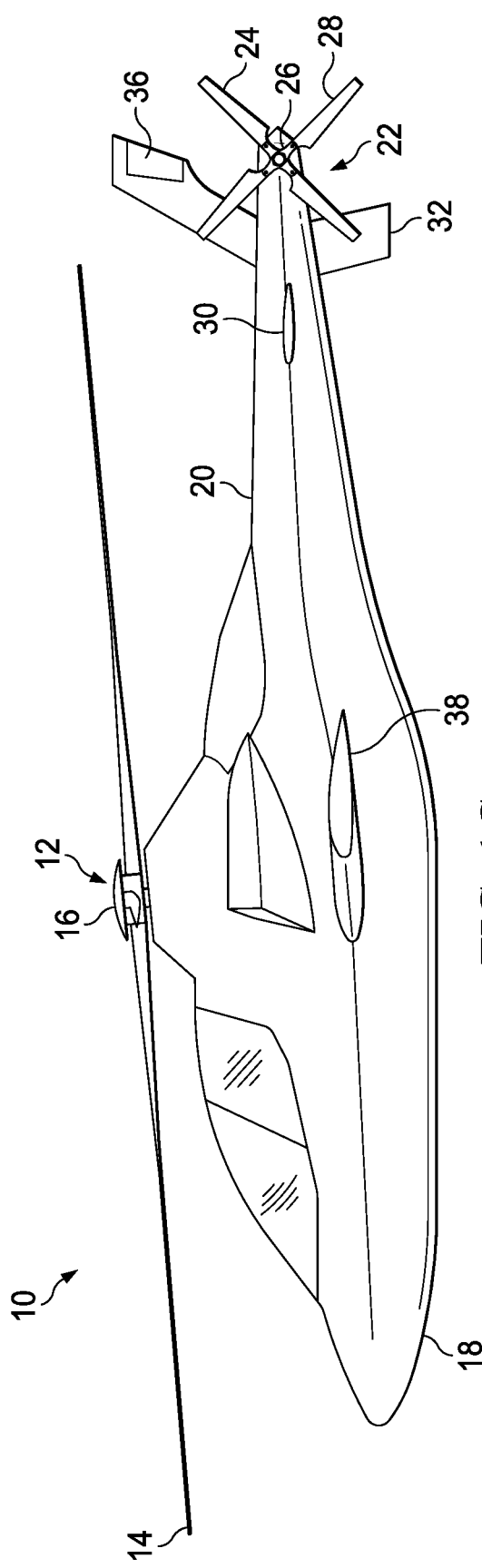

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a helicopter is schematically illustrated and generally designated 10. The primary propulsion assembly of helicopter 10 is a main rotor assembly 12. Main rotor assembly 12 includes a plurality of main rotor blade assemblies 14 extending radially outward from a main rotor hub 16. Main rotor hub 16 is rotatable relative to fuselage 18. The pitch of main rotor blade assemblies 14 can be collectively and/or cyclically manipulated to selectively control direction, thrust and lift of helicopter 10. A tailboom 20 extends from fuselage 18 in the aft direction. An anti-torque system 22 includes a tail rotor 24 that is rotatably coupled to the aft portion of tailboom 20. Tail rotor 24 includes a tail rotor hub 26 to which tail rotor blade assemblies 28 are coupled. Anti-torque system 22 manages the yaw of helicopter 10. Tailboom 20 also includes a horizontal stabilizer 30 and vertical stabilizer 32 to provide pitch and yaw stability for helicopter 10. In some embodiments, horizontal stabilizer 30 may include elevators 34 and vertical stabilizer 32 may include rudder 36 for additional pitch and yaw control. A wing 38 may be coupled to fuselage 18 to provide additional lift for helicopter 10 in forward flight. A retractable landing gear system (not shown) may provide ground support for helicopter 10.

The airfoil components of previous aircraft have often been manufactured using a foam, such as urethane, which is injected and shaped in a mold. Composite layers are then applied to the shaped foam and cured to form the skin and other parts of the airfoil component. Shaped foam may be difficult to resize in an economical manner and is susceptible to cracking when compressed during the curing process. For example, some foams crack when compressed two percent or more. Nomex and large cell carbon cores have also been used to form tools for airfoil components of previous aircraft, although such materials may be similarly difficult to resize or retool and therefore may be detrimental to the iterative design process. Another prior process for manufacturing airfoil components requires a spar to be laid up in halves that are subsequently bonded and bridged together with an abrasion strip after a core has been inserted therebetween. This process, however, requires a segmented spar that is not monolithic, adding additional steps to the manufacturing process and potentially weakening the spar itself.

Figure 1D:
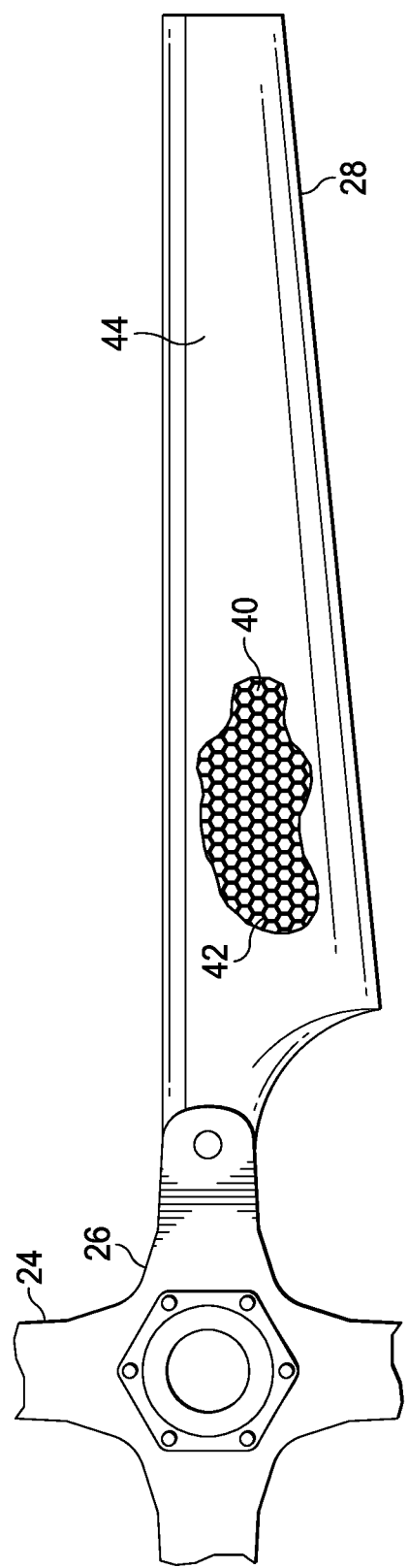

Instead of, or in addition to, material such as Nomex, large cell carbon core or shaped foam, the illustrative embodiments utilize an additively manufactured material that acts as an inner tool surface and interior substructure that remains in the cured airfoil component and doubles as a flyaway tool 40. As best seen in FIG. 1D, tail rotor blade assembly 28 is manufactured using flyaway tool 40, which is integrated into the final structure of tail rotor blade assembly 28 and used in flight. Flyaway tool 40 has an infill support core 42 that is additively manufactured and provides internal structural support when flyaway tool 40 is subjected to curing pressure as well as other stresses. Skin 44, which is formed from one or more layers of composite material, is disposed on flyaway tool 40. In some embodiments, a spar (not shown) may be interposed between flyaway tool 40 and skin 44. Flyaway tool 40 and skin 44 form tail rotor blade assembly 28 used by anti-torque system 22 of helicopter 10 to control yaw during flight. It will be appreciated by one of ordinary skill in the art that an additively manufactured flyaway tool such as flyaway tool 40 may be part of an assembly for any airfoil component of helicopter 10 such as main rotor blade assembly 14, horizontal stabilizer 30, vertical stabilizer 32, elevators 34, rudder 36 and/or wing 38. It will be further appreciated by one of ordinary skill in the art that the flyaway tools disclosed herein may be used for non-airfoil components of helicopter 10.

It should be appreciated that helicopter 10 is merely illustrative of a variety of aircraft that can implement the embodiments disclosed herein. Indeed, flyaway tool 40 may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that flyaway tool 40 can be integrated into a variety of aircraft configurations. It should be appreciated that even though aircraft are particularly well-suited to implement the embodiments of the present disclosure, non-aircraft vehicles and devices can also implement the embodiments.

Figure 2A:
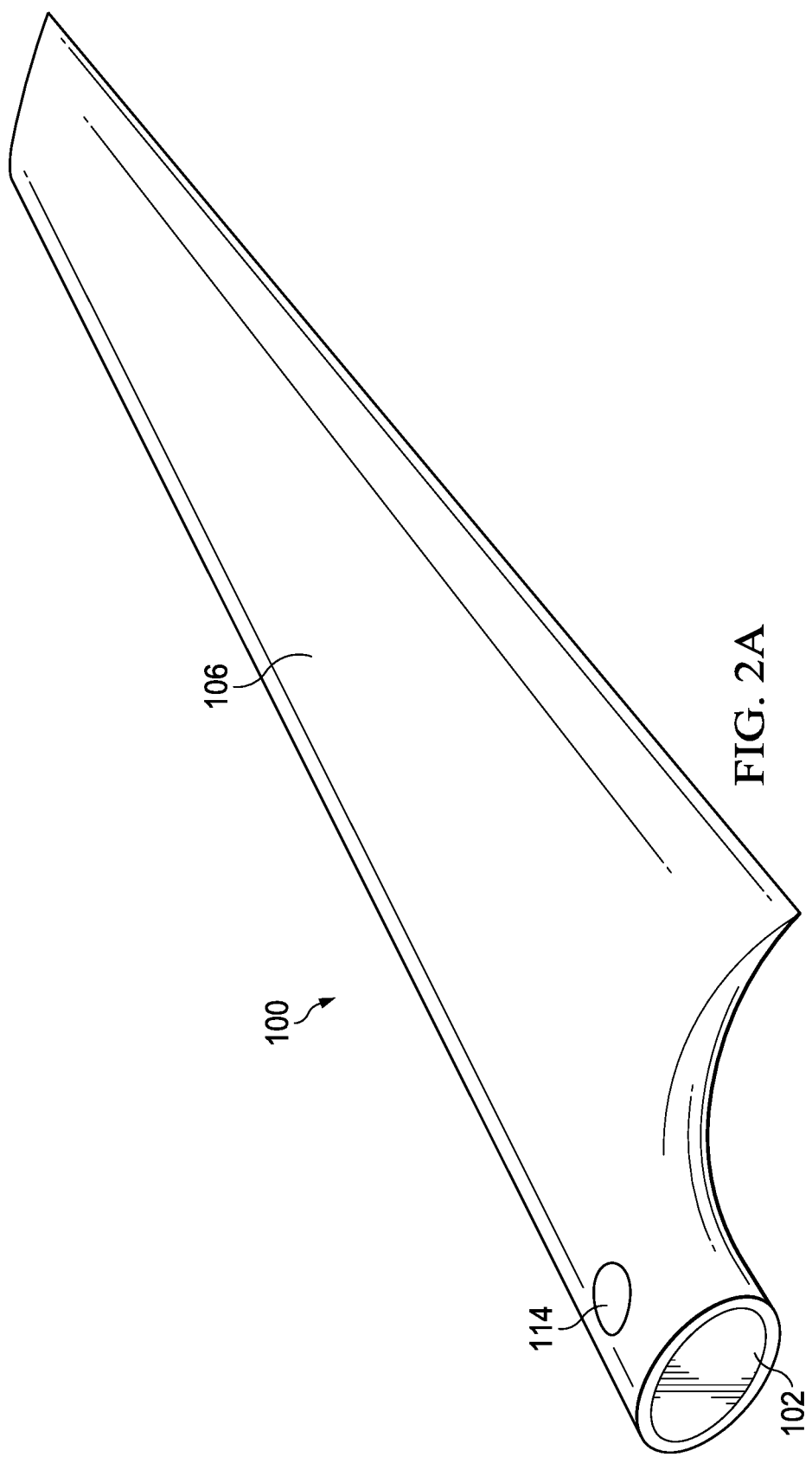
FIGS. 2A-2G are various views of a tail rotor blade assembly formed from an additively manufactured flyaway tool in accordance with embodiments of the present disclosure.
Figure 2B:
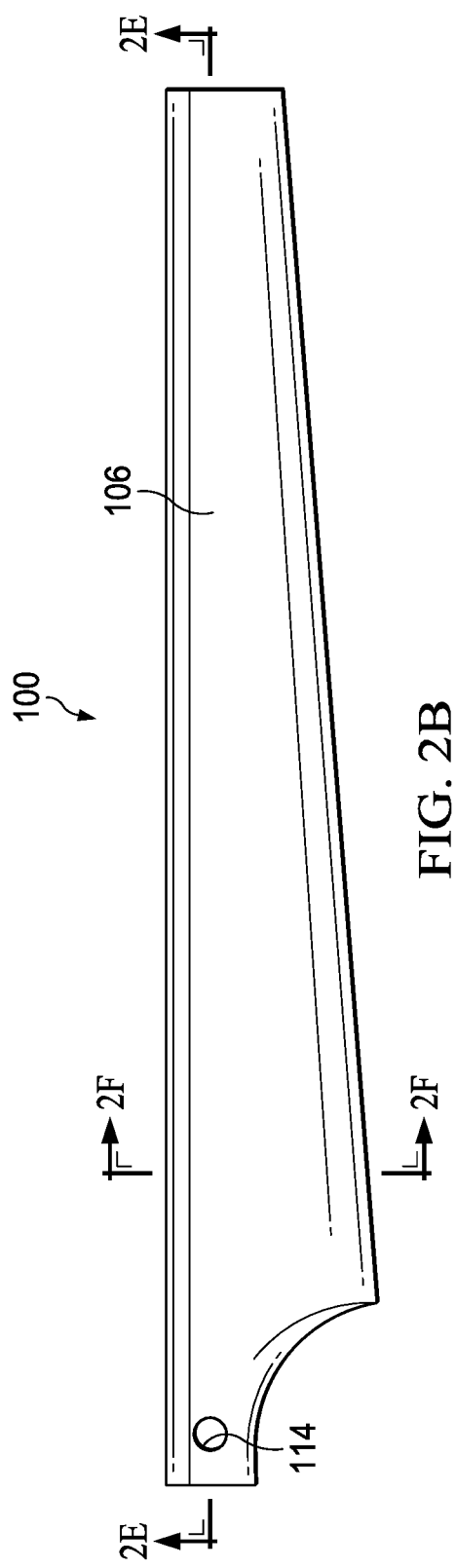
Figure 2C:
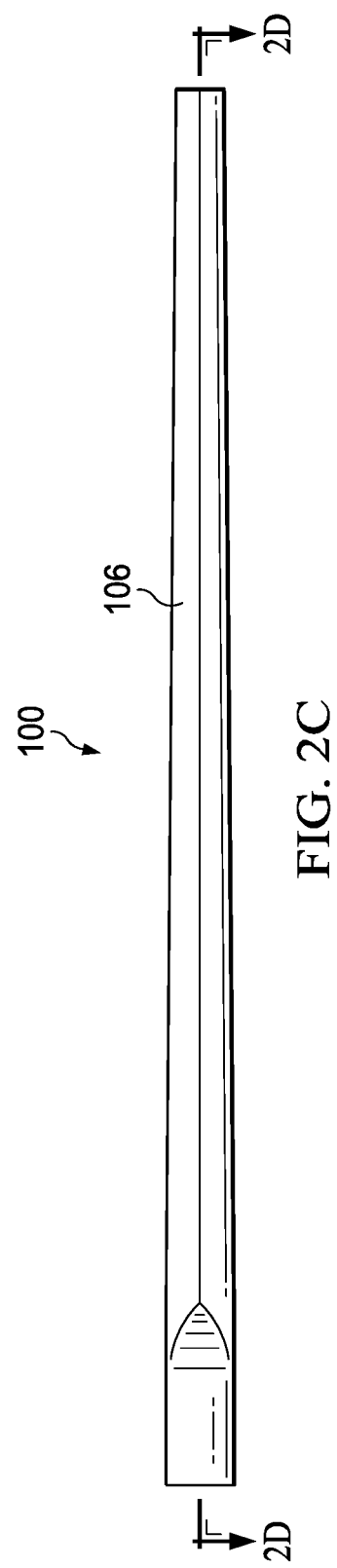
Figure 2D:
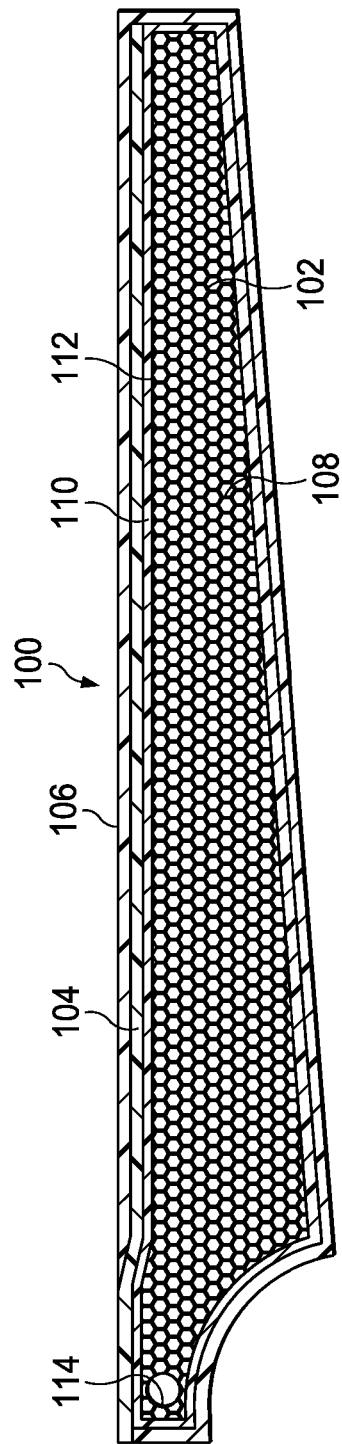
Figure 2E:
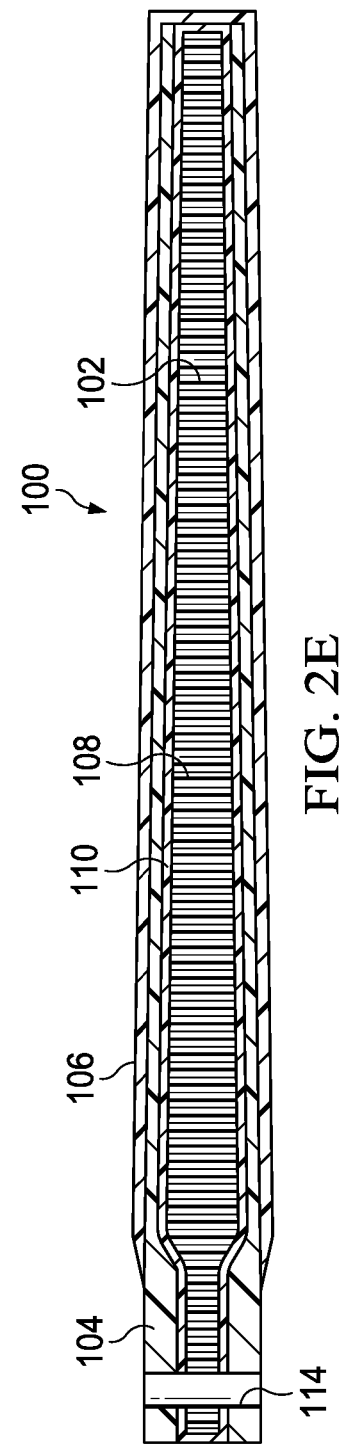
Figure 2F:
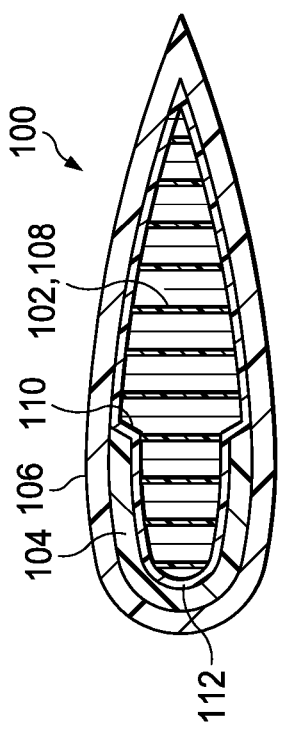
Figure 2G:
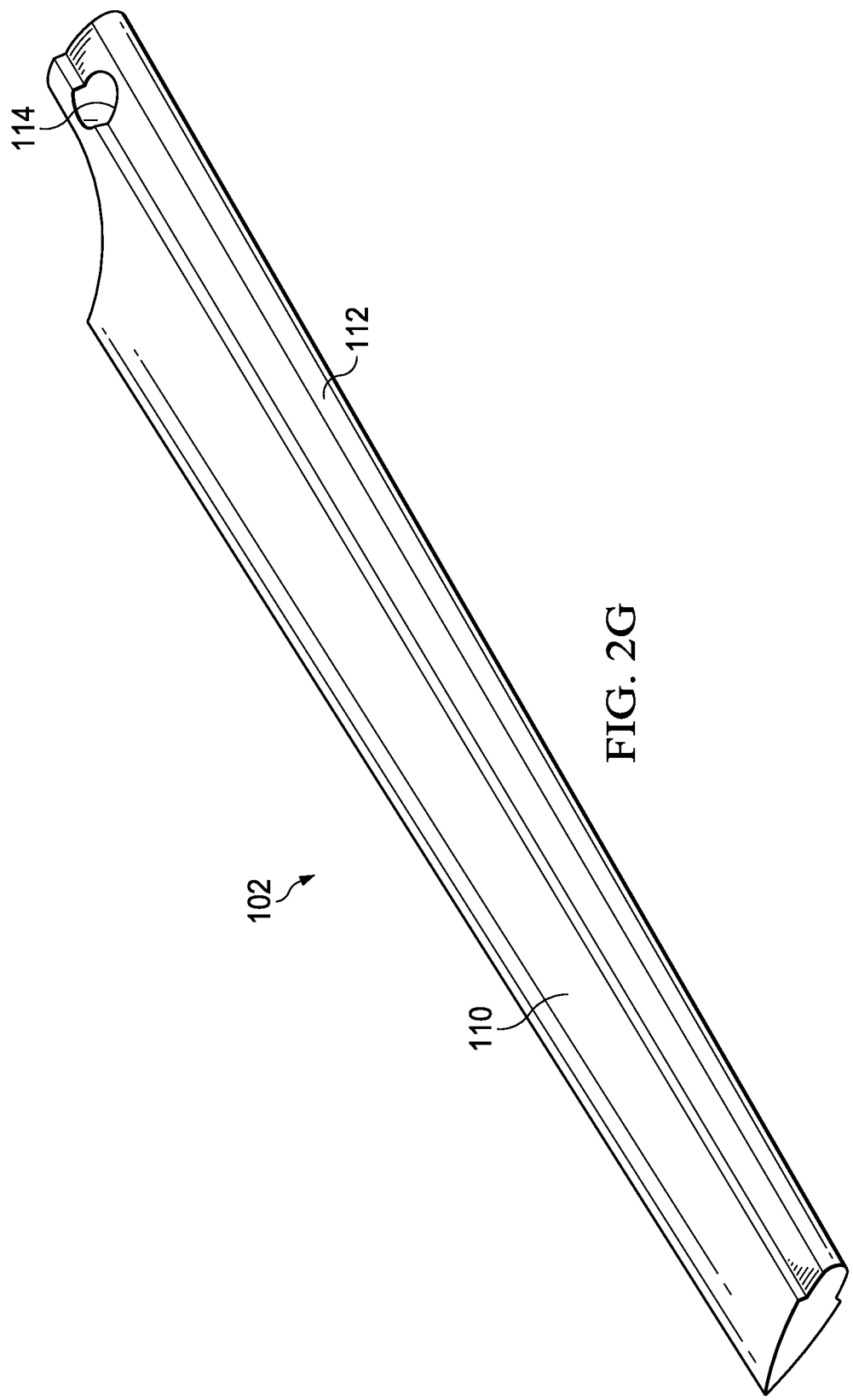

Referring to FIGS. 2A-2G in the drawings, a rotor blade assembly for an aircraft is schematically illustrated and generally designated 100. Rotor blade assembly 100 may be a main rotor blade assembly, a tail rotor blade assembly or any other type of rotor blade assembly. Rotor blade assembly 100 includes additively manufactured flyaway tool 102 on which spar 104 and skin 106 are laid. Flyaway tool 102 is formed from infill support core 108 and an interface sheet, or membrane, 110. Infill support core 108 provides structural support for interface sheet 110. Interface sheet 110 surrounds infill support core 108 and is used as the tool surface on which spar 104 and skin 106 are formed. Interface sheet 110 is also integral, or monolithic, with infill support core 108. Flyaway tool 102 has a generally airfoil shape that forms the underlying substructure for rotor blade assembly 100. The forward edge of infill support core 108 forms spar indentation 112 on which spar 104 is disposed. As best seen in FIG. 2D, infill support core 108 forms a hexagon pattern to reinforce interface sheet 110 when being subjected to curing pressures. In other embodiments, infill support core 108 may form other patterns such as any polygonal, irregular, curved, circular, grid-like or organic pattern. Other non-limiting examples of polygonal patterns include triangular and square patterns. Infill support core 108 may also include internal structural stiffeners (not shown) to provide additional strength to interface sheet 110. Such internal structural stiffeners may be vertical, angled or organic and/or inserted into flyaway tool 102 after flyaway tool 102 has been additively manufactured. In some embodiments, the internal structural stiffeners may be formed from a different material than flyaway tool 102.

Additive manufacturing encompasses many different manufacturing processes in which materials are cumulatively deposited on a substrate or on one another to form a physical object. 3D printing is one type of additive manufacturing process in which a physical object is formed from a digital model by laying down many thin layers of a material in secession. Flyaway tool 102 has been 3D printed. Any material capable of being used in an additive manufacturing process such as 3D printing may be used to form flyaway tool 102. For example, flyaway tool 102 may be 3D printed in any plastic or polymer such as acrylonitrile butadiene styrene (ABS), polylactic acid (PLA), nylon, polyamide, polyetheretherketones (PEEK), polyethylene terephthalate (PET), polyethylene terephthalate glycol (PETG) or ULTEM polyetherimide (PEI). Such plastics and polymers may be embedded with any material such as a conductive, metal or wood material and may also be fiber reinforced with carbon, glass or other fibers. Flyaway tool 102 may also be 3D printed in any metal, ceramic, sandstone, composite or resinous material. Any of the aforementioned materials may be modified to increase the temperature tolerance of the material. In some embodiments, the material from which flyaway tool 102 is formed is capable of maintaining the shape of flyaway tool 102 while composite layers are cured thereon. For example, the material from which flyaway tool 102 is formed may be selected to withstand curing temperatures in a range between 250-380 degrees Fahrenheit so that flyaway tool 102 does not glass transition or collapse during the curing process. The material from which flyaway tool 102 is formed may alternatively be selected to withstand temperatures less than 250 degrees Fahrenheit or greater than 380 degrees Fahrenheit.

Spar 104 is formed from one or more layers of composite material that are disposed on interface sheet 110 at spar indentation 112 of flyaway tool 102. Spar 104 provides additional structural support for rotor blade assembly 100 to withstand flight loads. Skin 106 is formed from one or more layers of composite material disposed on spar 104 and interface sheet 110 of flyaway tool 102. The inboard end of flyaway tool 102 may be used as a support block so that rotor blade assembly 100 may be coupled to one or more lugs or cuffs of a rotor hub such as main rotor hub 16 or tail rotor hub 26 in FIGS. 1A-1D. Portions of the inboard end of flyaway tool 102 may be machined away for this purpose. In the illustrated embodiment, hole 114 is formed through the inboard end of rotor blade assembly 100 including flyaway tool 102, spar 104 and/or skin 106. The inboard end of flyaway tool 102 may also be machined or sealed to prevent water intrusion. Flyaway tool 102, spar 104 and skin 106 form the final rotor blade assembly 100 that is used by an aircraft in flight.

Figure 3A:
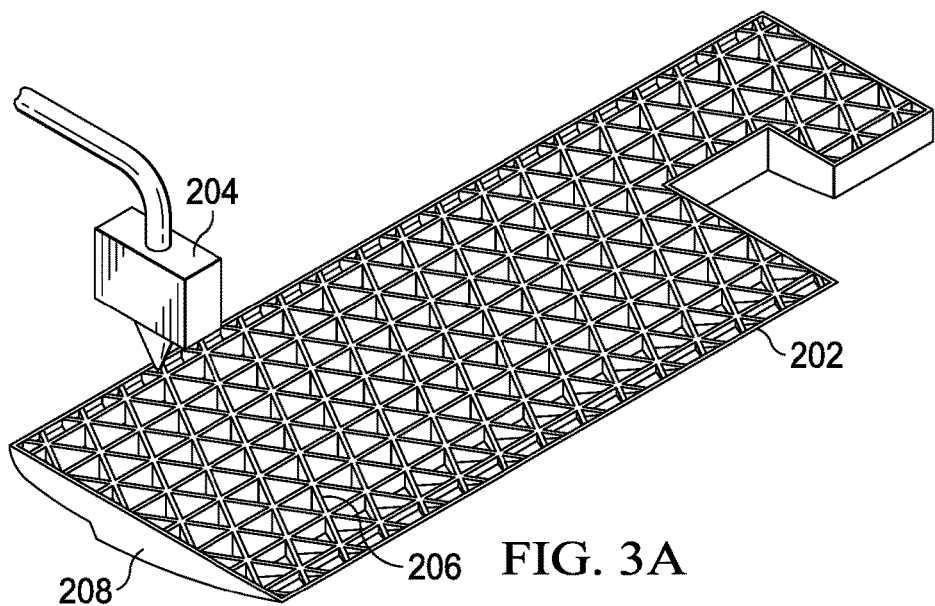
FIGS. 3A-3E are schematic illustrations of a process for manufacturing an airfoil component assembly using an additively manufactured flyaway tool in accordance with embodiments of the present disclosure.

Referring to FIGS. 3A-3E in the drawings, a process for manufacturing rotor blade assembly 200 is schematically illustrated. While rotor blade assembly 200 is an airfoil component, it will be appreciated by one of ordinary skill in the art that any aircraft component may be manufactured using the process described in FIGS. 3A-3E. FIG. 3A shows a segment of flyaway tool 202 being additively manufactured using 3D printer 204. In the illustrated embodiment, 3D printer 204 is printing infill support core 206 with a triangular infill pattern. 3D printer 204 is also printing interface sheet 208, which surrounds infill support core 206. Flyaway tool 202 may be 3D printed using any 3D printing technology including, but not limited to, material extrusion such as fused deposition modeling or fused filament fabrication, vat polymerization such as stereolithography or digital light processing, powder bed fusion such as selective laser sintering, selective laser melting, electronic beam melting or direct metal laser sintering, material jetting, binder jetting, drop on demand or laminated object manufacturing. Internal structural stiffeners (not shown) may be added to flyaway tool 202 during or after the 3D printing process shown in FIG. 3A. In other embodiments, flyaway tool 202 may be 3D printed without infill support core 206, leaving a hollow interface sheet 208.

Figure 3B:
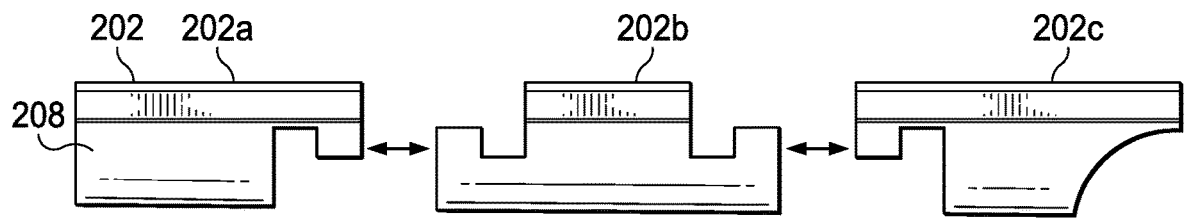

FIG. 3B shows flyaway tool 202 being assembled from flyaway tool segments 202a, 202b, 202c. The size, shape and number of flyaway tool segments 202a, 202b, 202c may vary depending on the embodiment. Because any number of flyaway tool segments 202a, 202b, 202c may be assembled to form flyaway tool 202, an aircraft component of any size may be manufactured using an additively manufactured flyaway tool of the illustrative embodiments, regardless of the build volume of 3D printer 204 or other additive size constraints. Flyaway tool segments 202a, 202b, 202c may be shaped to interlock with one another as illustrated or may be coupled to one another using adhesive or fasteners. In other embodiments, flyaway tool 202 may be 3D printed as a monolithic structure that does not require assembly.

Figure 3C:
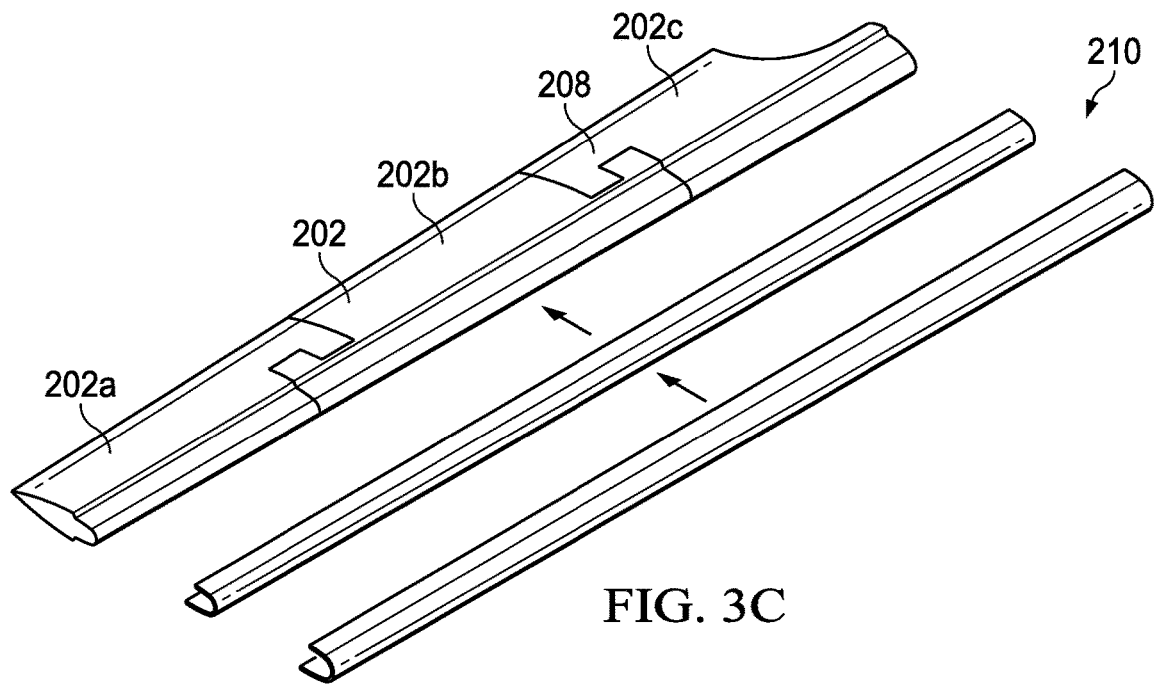
Figure 3D:
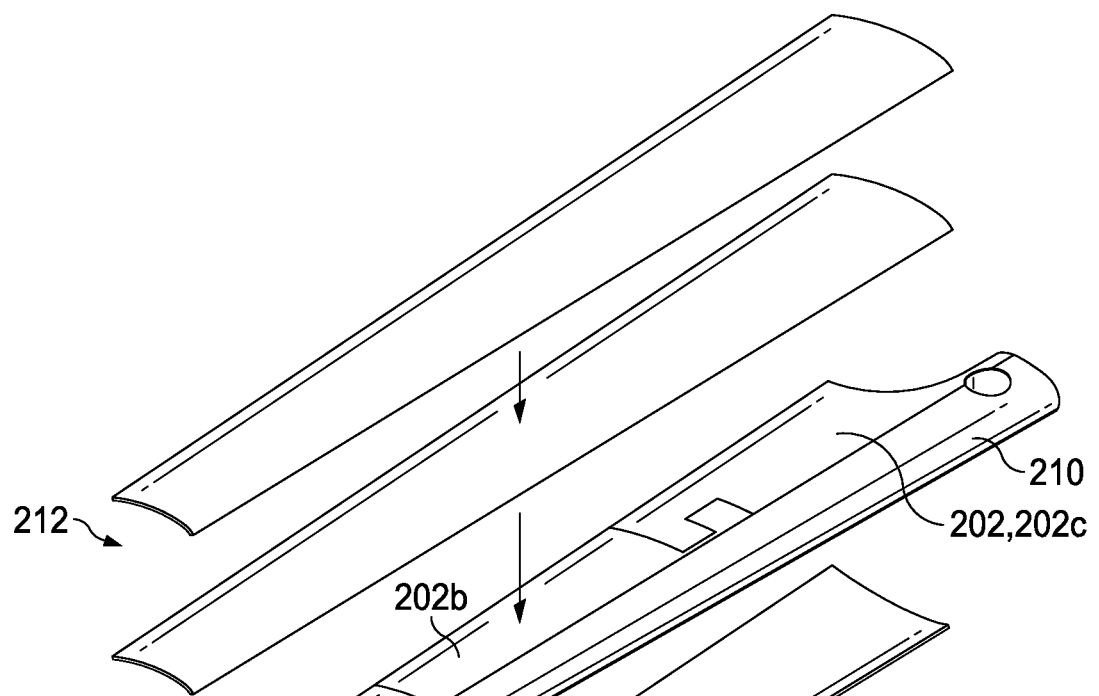

Flyaway tool 202 enables rotor blade assembly 200 to be manufactured using a wide range of manufacturing processes. In FIGS. 3C and 3D, flyaway tool 202 forms an inner mold line tool. Spar 210 is applied to interface sheet 208 and skin 212 is applied to spar 210 and interface sheet 208. More particularly, spar 210 and skin 212 are each formed from one or more layers, or plies, of composite material that are applied to flyaway tool 202 using a layup process. The layers of composite material are then cured to form a laminate. The size and shape of the composite layers shown in FIGS. 3C and 3D are for illustrative purposes only and may vary depending on the specific manufacturing technique.

In some embodiments, spar 210 and skin 212 may be formed from composite materials that may include numerous material plies composed of natural or synthetic and continuous or chopped filaments or fibers including one or more of glass, fiberglass, Kevlar, quartz, polyester, ceramics, polypropylene, carbon, graphite, basalt, aromatic polyamide materials or the like and any combination thereof. The material plies which form spar 210 and skin 212 may be in the form of braids, fibers or strands or fabrics such as veil mats, short fiber mats, biaxial cloth, triaxial cloth, woven fabrics, tape such as unidirectional tape and the like. Plies or individually-placed fibers may be joined together with a resin such as a polymeric matrix including thermoplastic or thermosetting resin or any suitable resin system such as epoxies, polyimides, polyamides, bismaleimides, polyesters, vinyl esters, polyurethane, phenolics, polyetheretherketones (PEEK), polyetherketones (PEK), polyphenylene sulfides (PPS) and the like. The resins may originate as a liquid and polymerize during the cure process and harden. Fabric that is preimpregnated with resin, or prepreg, may also be used to manufacture spar 210 and skin 212. The weight ratio of fibers to resin can range from 20% fibers and 80% resin to 70% fibers and 30% resin, although other ratios are within the scope of the illustrative embodiments. Higher and/or continuous fiber content can provide enhanced strength and stiffness. Fibers, whether individually placed or in sheet form, can be orientated in any direction such as 0, 45 or 90 degrees relative to a reference axis, as in some braided plies, to provide desired strength characteristics such as torsional stiffness. For example, braided off-axis fibers may be integrated to reinforce strength in an off-axis direction. The use of composite materials provides the ability to tailor the combination of fibers and resin to meet design requirements of rotor blade assembly 200 such as stiffness and perform better than standard materials.

Flyaway tool 202 has a simple geometry that enables a broad goods construction process such as a single layup and single cure. Spar 210 and skin 212 may be formed using a broad goods and/or layered tape construction process having a manual or automated layup of a plurality of composite broad goods material layers such as fiberglass fabric, carbon fabric, fiberglass tape, carbon tape and combinations thereof positioned over flyaway tool 202, thus forming a laminate stack. In one non-limiting example, the composite material of spar 210 and skin 212 may be wound or braided on a rotisserie to form rotor blade assembly 200. Flyaway tool 202 may have a tailored coefficient of thermal expansion to expand slightly more than the laminate, thus helping to prevent wrinkle creation at the corners of flyaway tool 202. Manual, or hand, layup composite preforms may be composed of layers at various orientations that are engineered to provide the desired mechanical properties for rotor blade assembly 200. The layers of spar 210 and skin 212 may also be applied using automated fiber placement in which automated fiber placement machines place fiber reinforcements on flyaway tool 202 in an automatic fashion and use a number of separate small width tows (e.g., 8 mm or less) of thermoset or thermoplastic preimpregnated materials to form composite layups. The structure of flyaway tool 202 allows for an entirely automated broad goods layup or the combination of an automated and a manual broad goods layup. Use of broad goods such as a single automated broad goods layup and single cure may enhance producibility and quality due to the reduced complexity of the manufacturing process, but also result in lower production costs, more efficient material usage, reduced labor hours and reduced energy consumption. Even though particular methods of manufacture, composites, components and subassemblies have been described herein, it should be understood by those having ordinary skill in the art that other methods of manufacture, composites, components and subassemblies could alternatively or additionally be used to apply spar 210 and skin 212 to flyaway tool 202.

In one example, spar 210 and skin 212 may be formed using a layup process wherein a plurality of plies, which may be preimpregnated with an uncured resin, are placed on flyaway tool 202. The plies may have the same or different shapes, may be the same or different materials, may have the same or different fabric weaves, may have the same or different thicknesses, may be continuous or discontinuous, may extend beyond the periphery of flyaway tool 202 or be fully within the periphery of flyaway tool 202, may be oriented in the same or different directions and/or may have other similarities or differences. In one embodiment, the plies may be an intermediate modulus epoxy resin impregnated carbon fiber fabric that is stiffer than conventional composite fabrics, thereby allowing for fewer plies and reducing the weight and manufacturing cost. Each fabric layer is considered a ply of the laminate with the total number of plies ranging from between a single ply to about 100 plies. Any number of composite layers or plies may be used to form spar 210 and skin 212. In one non-limiting example, skin 212 may be formed from three to five composite layers. In some embodiments, each ply of skin 212 may have ends that are butt-spliced to one another to form a closed loop. It should be noted that gaps have been shown between the layers of spar 210 and skin 212 in the exploded views of FIGS. 3C and 3D for clarity of illustration. It will be understood by those skilled in the art that in the actual layup, adjacent layers would generally be in contact with each other unless another material such as reinforcement material has been interposed therebetween. In yet other embodiments, the composite layers of spar 210 and skin 212 may be applied using a spray layup process.

Following layup of the plies of spar 210 and skin 212, the plies may be compacted, or debulked, to remove any pockets of air and to provide adequate attachment therebetween. The compacting step can be achieved by applying a vacuum to the plies in the mold, by pressurization or by pressing a second mold member or roller on the plies. Compacting not only consolidates the layup but also removes air trapped in the resin matrix that would otherwise create undesirable voids (air pockets) in the laminate that could weaken the spar 210 or skin 212. After the plies are compacted, the plies of spar 210 and skin 212 may be cured to form a laminate by heating and/or pressurizing the plies, such as by heating the plies for two hours at 350 degrees Fahrenheit and at 90 psi. In the curing process, flyaway tool 202 and the composite layers of spar 210 and skin 212 applied on flyaway tool 202 may be inserted into an autoclave, which is a pressure chamber used to carry out industrial and scientific processes requiring elevated temperature and pressure in relation to ambient temperature and pressure. Following the curing process, the laminate may be trimmed or otherwise machined as desired. After curing, the composite material layers form a high strength, lightweight composite spar 210 and skin 212. In addition to the aforementioned manufacturing methods, it will be appreciated by one of ordinary skill in the art that the geometry of flyaway tool 202 is compatible with a wide variety of additive, subtractive or formative manufacturing techniques including, but not limited to, extrusion, machining, 3D printing, stamping, welding or casting as well as others.

Figure 3E:
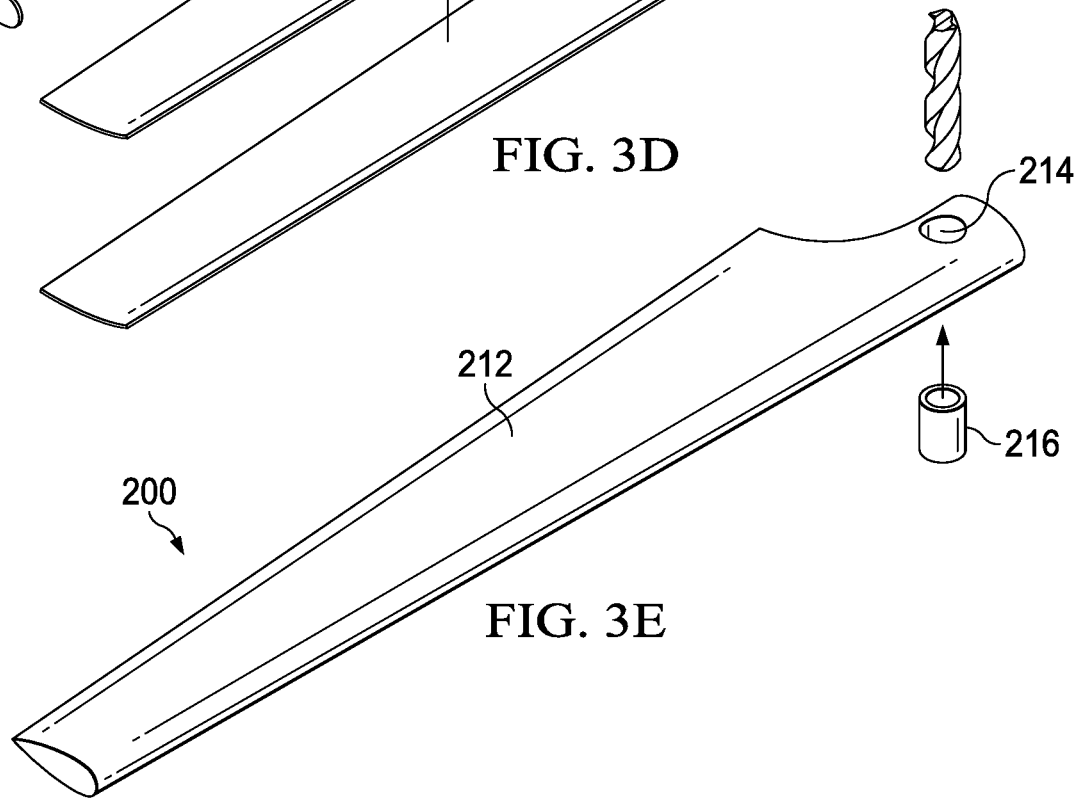

FIG. 3E shows rotor blade assembly 200 undergoing machining for final use on board an aircraft. In particular, hole 214 is machined through the inboard end of rotor blade assembly 200 and a hollow cylindrical reinforcement member 216 may be inserted into hole 214. Hole 214 traverses flyaway tool 202, skin 212 and/or spar 210. Rotor blade assembly 200 may be attached to a rotor hub such as main rotor hub 16 or tail rotor hub 26 in FIGS. 1A-1D via reinforced hole 214. After being manufactured as shown in FIGS. 3A-3E, rotor blade assembly 200 including flyaway tool 202, spar 210 and skin 212 may be installed on an aircraft for use by the aircraft in flight.

The utilization of additive manufacturing to form flyaway tool 202 allows flyaway tool 202 to be quickly changed and manufactured on demand in view of stress tests, flight tests and other prototyping or quality control processes. Flyaway tool 202 is thus beneficial to the iterative design process. Additive processes also conveniently allow for any amount of material to be used to create infill support core 206 to strike a suitable balance between weight, cost and strength. For example, infill support core 206 may take up anywhere from 0-100 percent of the volume within interface sheet 208 based on operational needs. Because additive manufacturing processes allow for real-time, on-site manufacturing of flyaway tool 202, the thickness or size of flyaway tool 202 may be easily modified to accommodate different numbers of composite layers of spar 210 and skin 212. Flyaway tool 202 may also be manufactured at lower cost and with reduced post-process machining using additive manufacturing. Flyaway tool 202 does not require bags for inflation against the tool or caul plates to apply pressure thereon. Flyaway tool 202 facilitates the composite layup process since both sides of rotor blade assembly 200 may be laid up as an integral member, if so desired, so that there is no need to bond the upper and lower halves of spar 210 after layup.

Figure 4A:
FIGS. 4A-4C are various views of a rotor blade assembly formed from an additively manufactured flyaway tool including an organic infill support core in accordance with embodiments of the present disclosure.
Figure 4B:
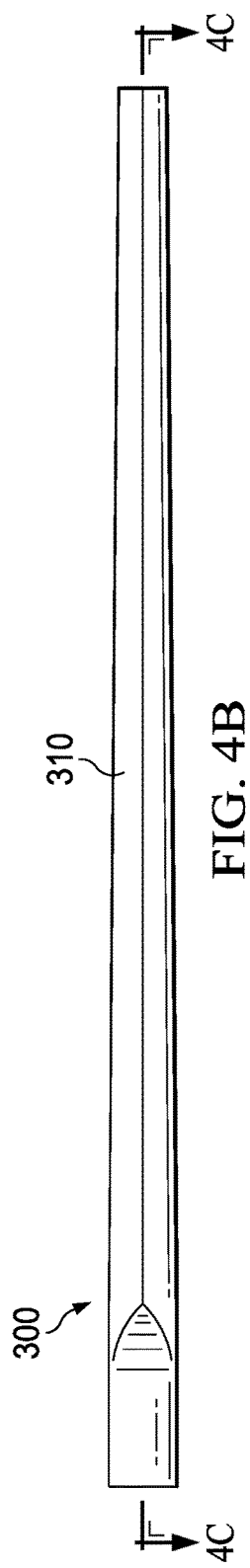
Figure 4C:
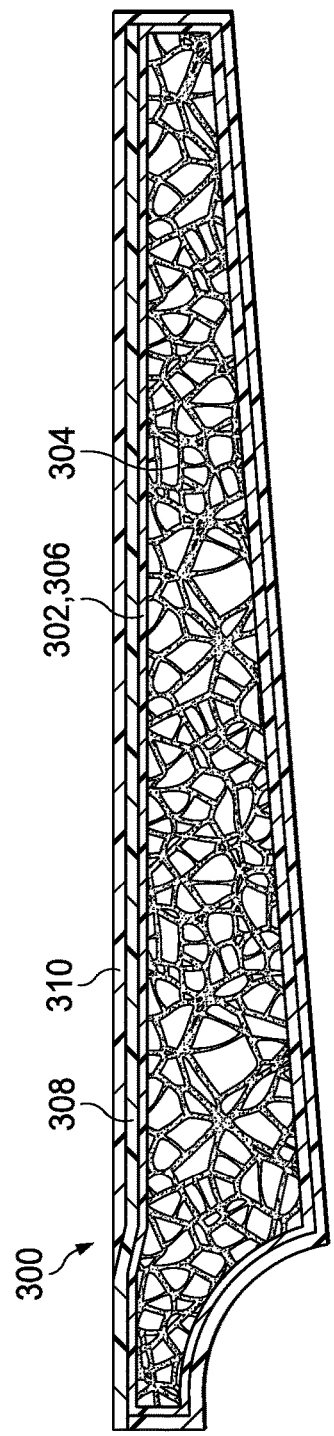

Referring to FIGS. 4A-4C in the drawings, a rotor blade assembly for use on an aircraft is schematically illustrated and generally designated 300. Rotor blade assembly 300 includes flyaway tool 302 including infill support core 304 and interface sheet 306. Spar 308 and skin 310 have been applied onto interface sheet 306 of flyaway tool 302. Flyaway tool 302 has been generatively designed. Generative design is a computer-assisted drawing software function in which artificial intelligence algorithms generate and evaluate hundreds or thousands of potential designs for a part that satisfies one or more constraints such as part size or geometric dimensions, permissible loads or operating conditions, target weight, materials, manufacturing methods or cost per unit. Generative design often results in an organic, or biological-like, design. Advantageously, additive manufacturing techniques such as 3D printing are capable of manufacturing such organic designs. As best seen in FIG. 4C, infill support core 304 has an organic infill pattern that has been generatively designed to meet predefined constraints. Flyaway tool 302 with organic infill support core 304 may be lighter and use less material than geometric or polygonal 3D printed infills.

Figure 5A:
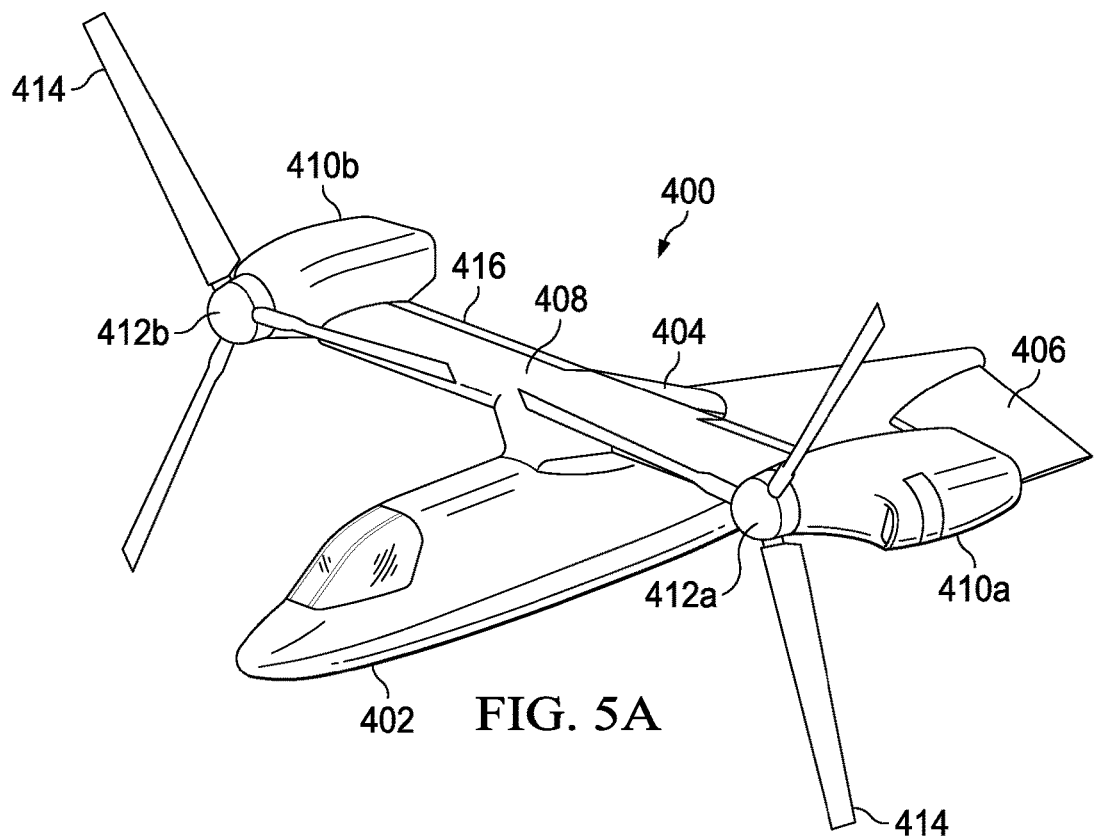
FIGS. 5A-5B are schematic illustrations of a tiltrotor aircraft having one or more airfoil component assemblies formed from an additively manufactured flyaway tool in accordance with embodiments of the present disclosure.
Figure 5B:
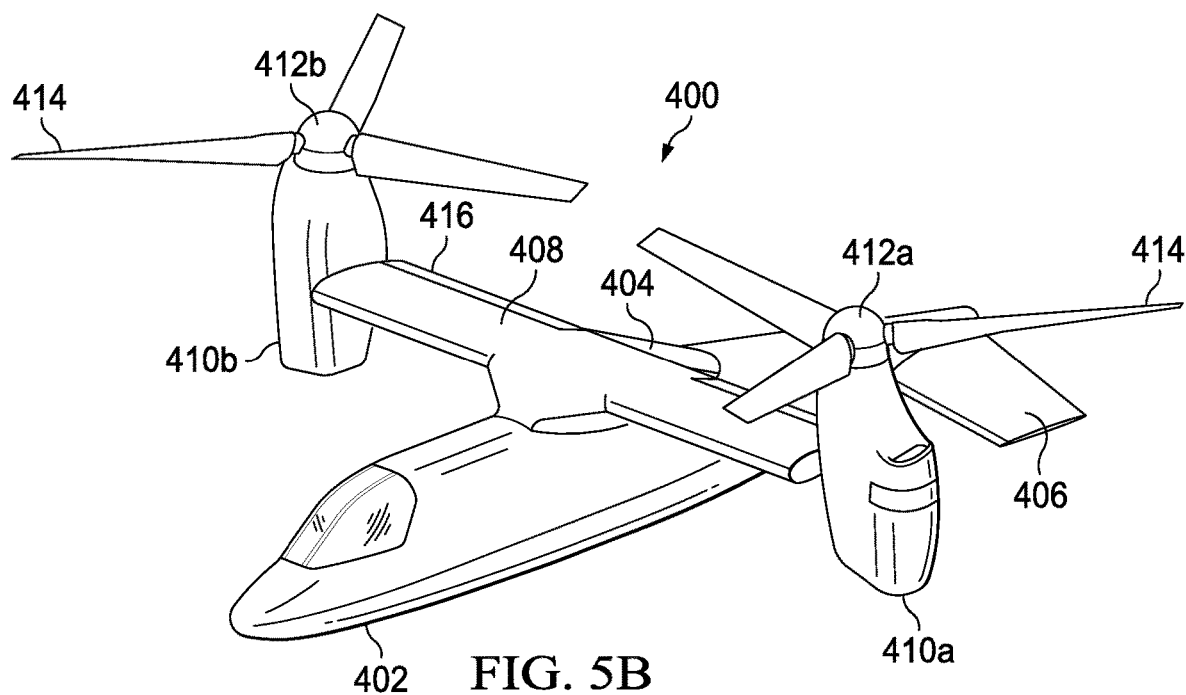

Referring to FIGS. 5A-5B in the drawings, a tiltrotor aircraft utilizing one or more additively manufactured flyaway tools is schematically illustrated and generally designated 400. Tiltrotor aircraft 400 includes a fuselage 402, a wing mount assembly 404 and a tail assembly 406. Tail assembly 406 may have control surfaces operable for horizontal and/or vertical stabilization during flight. A landing gear system (not shown) may provide ground support for tiltrotor aircraft 400. A wing 408 is supported by fuselage 402 and wing mount assembly 404.

Coupled to the outboard ends of wing 408 are pylon assemblies 410a, 410b. Pylon assembly 410a is rotatable relative to wing 408 between a generally horizontal orientation, as best seen in FIG. 5A, and a generally vertical orientation, as best seen in FIG. 5B. Pylon assembly 410a includes a rotatable portion of the drive system and a proprotor assembly 412a that is rotatable responsive to torque and rotational energy provided by an engine or motor of the drive system. Likewise, pylon assembly 410b is rotatable relative to wing 408 between a generally horizontal orientation, as best seen in FIG. 5A, and a generally vertical orientation, as best seen in FIG. 5B. Pylon assembly 410b includes a rotatable portion of the drive system and a proprotor assembly 412b that is rotatable responsive to torque and rotational energy provided by an engine or motor of the drive system. In the illustrated embodiment, proprotor assemblies 412a, 412b each include three proprotor blade assemblies 414. It should be understood by those having ordinary skill in the art, however, that proprotor assemblies 412a, 412b could alternatively have a different number of proprotor blade assemblies, either less than or greater than three. In addition, it should be understood that the position of pylon assemblies 410a, 410b, the angular velocity or revolutions per minute (RPM) of proprotor assemblies 412a, 412b, the pitch of proprotor blade assemblies 414 and the like may be controlled by the pilot of tiltrotor aircraft 400 and/or a flight control system to selectively control the direction, thrust and lift of tiltrotor aircraft 400 during flight.

FIG. 5A illustrates tiltrotor aircraft 400 in a forward flight mode or airplane flight mode, in which proprotor assemblies 412a, 412b are positioned to rotate in a substantially vertical plane and provide a forward thrust while a lifting force is supplied by wing 408 such that tiltrotor aircraft 400 flies much like a conventional propeller driven aircraft. FIG. 5B illustrates tiltrotor aircraft 400 in a vertical takeoff and landing (VTOL) flight mode or helicopter flight mode, in which proprotor assemblies 412a, 412b are positioned to rotate in a substantially horizontal plane and provide a vertical thrust such that tiltrotor aircraft 400 flies much like a conventional helicopter. During operation, tiltrotor aircraft 400 may convert from helicopter flight mode to airplane flight mode following vertical takeoff and/or hover. Likewise, tiltrotor aircraft 400 may convert back to helicopter flight mode from airplane flight mode for hover and/or vertical landing. In addition, tiltrotor aircraft 400 can perform certain flight maneuvers with proprotor assemblies 412a, 412b positioned between airplane flight mode and helicopter flight mode, which can be referred to as conversion flight mode.

Wing 408 and pylon assemblies 410a, 410b form part of a propulsion and lift system for tiltrotor aircraft 400. Fuselage 402 may include a drive system, including an engine, motor and/or transmission, for providing torque and rotational energy to each proprotor assembly 412a, 412b via one or more drive shafts located in wing 408. In other embodiments, each pylon assembly 410a, 410b houses a drive system, such as an engine, motor and/or transmission, for supplying torque and rotational energy to a respective proprotor assembly 412a, 412b. In such embodiments, the drive systems of each pylon assembly 410a, 410b may be coupled together via one or more drive shafts located in wing 408 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Any of the airfoil components of tiltrotor aircraft 400 may be formed using an additively manufactured flyaway tool as described in the illustrative embodiments. For example, wing mount assembly 404, tail assembly 406, wing 408, ailerons 416 of wing 408, all or a portion of pylon assemblies 410a, 410b, spinners of proprotor assemblies 412a, 412b or proprotor blade assemblies 414 may be formed using an additively manufactured flyaway tool. Non-airfoil components of tiltrotor aircraft 400 may also be formed using an additively manufactured flyaway tool.

Figure 6A:
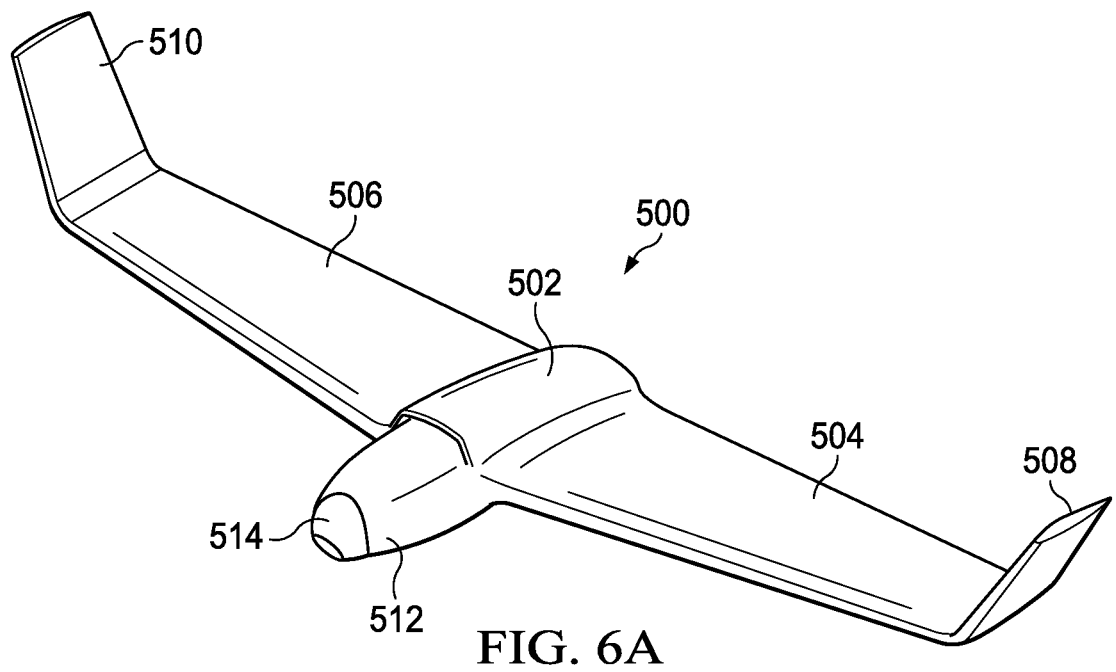
FIGS. 6A-6B are schematic illustrations of an unmanned aerial system having one or more airfoil component assemblies formed from an additively manufactured flyaway tool in accordance with embodiments of the present disclosure.
Figure 6B:
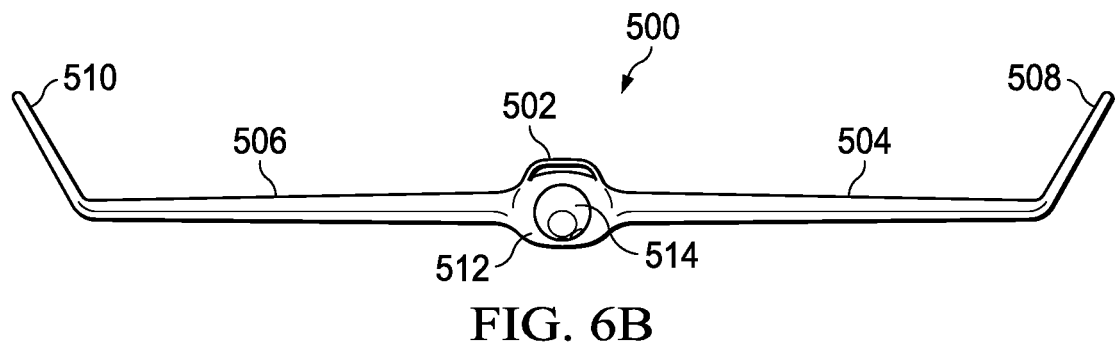

Referring to FIGS. 6A-6B in the drawings, an unmanned aerial system utilizing one or more additively manufactured flyaway tools is schematically illustrated and generally designated 500. Unmanned aerial system 500 includes fuselage 502 from which wings 504, 506 protrude. Wings 504, 506 include winglets 508, 510. Fuselage 502 houses a propulsion assembly to propel unmanned aerial system 500 in a forward direction. Nose assembly 512 of fuselage 502 includes inset and rotatable turret assembly 514. Any of the airfoil or non-airfoil components of unmanned aerial system 500 may be formed using an additively manufactured flyaway tool as described in the illustrative embodiments. For example, fuselage 502, wings 504, 506, winglets 508, 510, nose assembly 512 or turret assembly 514 may be formed, or include portions formed, using an additively manufactured flyaway tool.

Figure 7A:
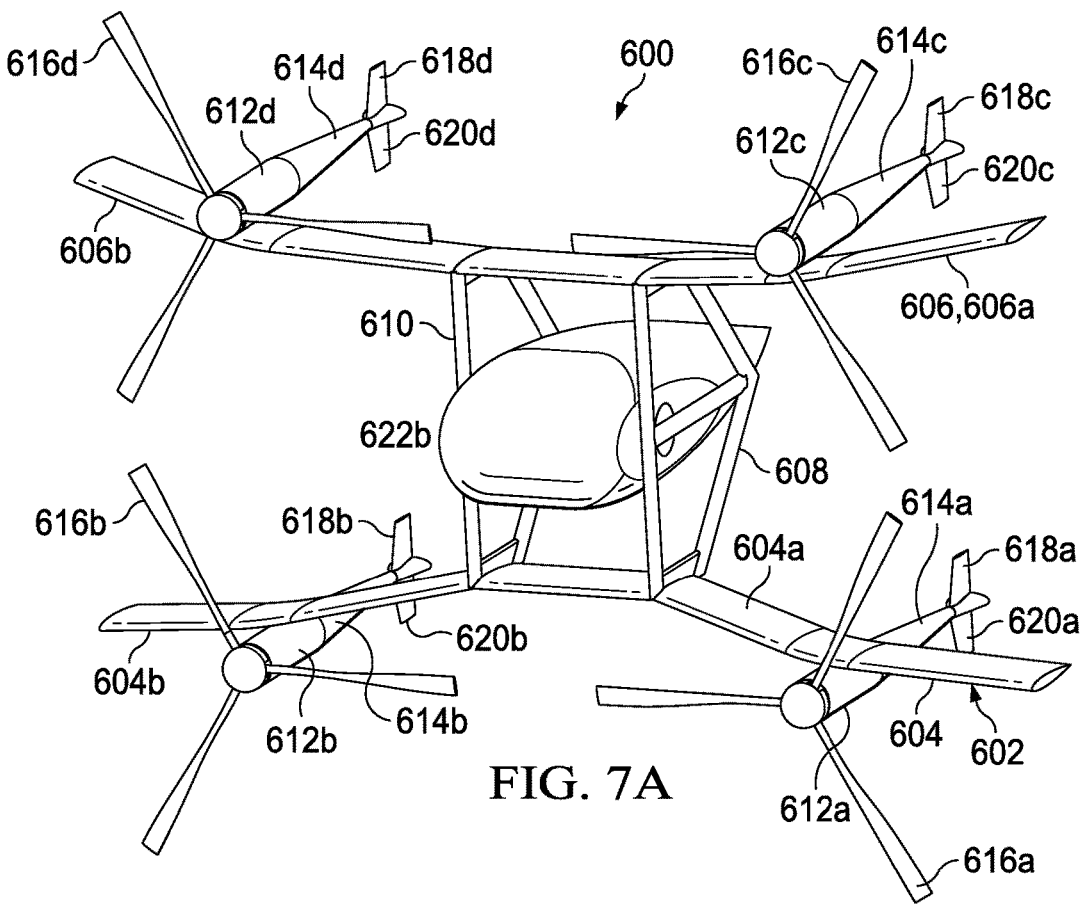
FIGS. 7A-7B are schematic illustrations of an aircraft having one or more airfoil component assemblies formed from an additively manufactured flyaway tool in accordance with embodiments of the present disclosure.
Figure 7B:
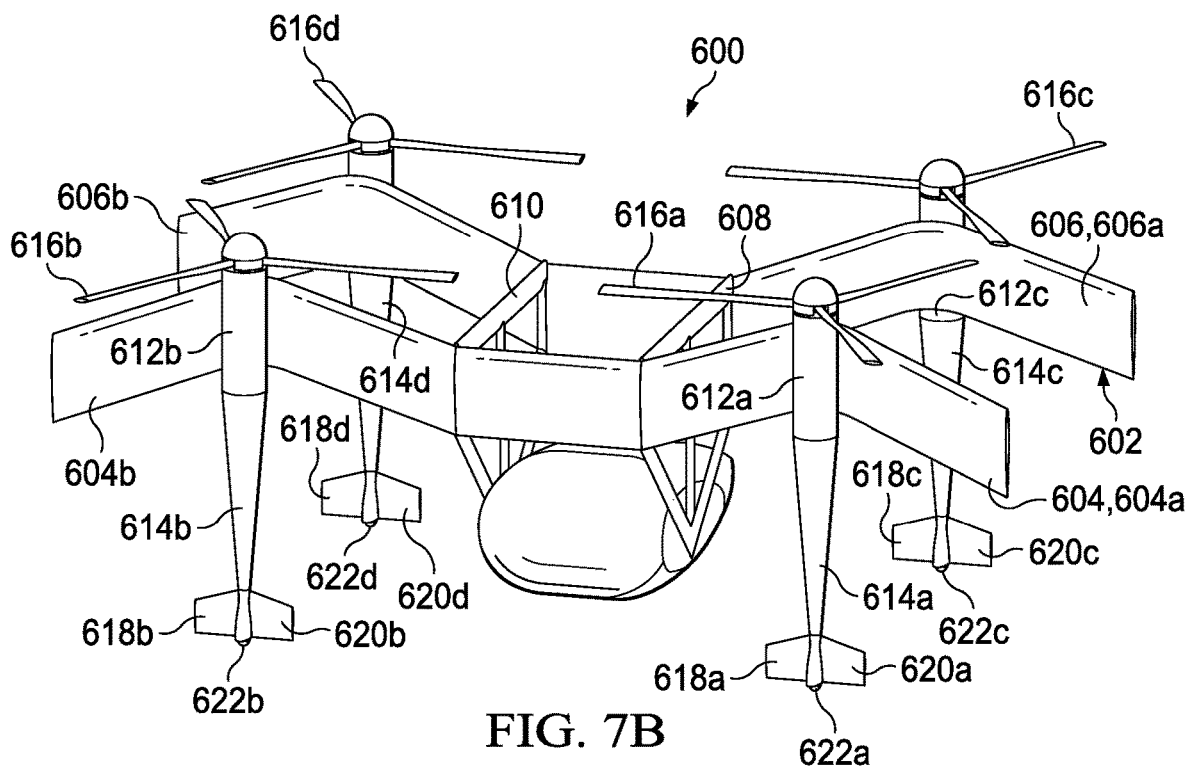

Referring to FIGS. 7A-7B in the drawings, various views of an aircraft 600 are depicted. In the illustrated embodiment, aircraft 600 including an airframe 602 having wings 604, 606 each have an airfoil cross-section that generates lift responsive to the forward airspeed of aircraft 600. Wings 604, 606 may be formed as single members or may be formed from multiple wing sections. The outer skins for wings 604, 606 are preferably formed from high strength and lightweight materials such as fiberglass fabric, carbon fabric, fiberglass tape, carbon tape and combinations thereof that may be formed by curing together a plurality of material layers on an additively manufactured flyaway tool.

Extending generally perpendicularly between wings 604, 606 are truss structures depicted as pylons 608, 610. Pylons 608, 610 are preferably formed from high strength and lightweight materials such as fiberglass fabric, carbon fabric, fiberglass tape, carbon tape and combinations thereof that may be formed by curing together a plurality of material layers on an additively manufactured flyaway tool. Preferably, wings 604, 606 and pylons 608, 610 are securably attached together at the respective intersections by bolting, bonding and/or other suitable technique such that airframe 602 becomes a unitary member. As illustrated, wings 604, 606 are polyhedral wings with wing 604 having anhedral sections 604a, 604b and with wing 606 having dihedral sections 606a, 606b.

In the illustrated embodiment, the propulsion system includes a plurality of propulsion assemblies 612a, 612b, 612c, 612d. Propulsion assemblies 612a, 612b are securely attached to airframe 602 in a high wing configuration and propulsion assemblies 612c, 612d are securely attached to airframe 602 in a low wing configuration by bolting or other suitable technique. Preferably, each propulsion assembly 612a, 612b, 612c, 612d includes a nacelle 614a, 614b, 614c, 614d that houses a power source, an engine or motor, a drive system, a rotor hub, actuators and an electronics node including, for example, controllers, sensors and communications elements as well as other components suitable for use in the operation of a propulsion assembly. Each propulsion assembly 612a, 612b, 612c, 612d has a rotor assembly including the rotor hub and a proprotor 616a, 616b, 616c, 616d, the blades of which are preferably operable for collective pitch control. As an alternative, the pitch of the blades may be fixed, in which case, thrust is determined by changes in the rotational velocity of the proprotors. In the illustrated embodiment, the rotor hubs have a tilting degree of freedom to enable thrust vectoring. Each propulsion assembly 612a, 612b, 612c, 612d also includes a tail assembly 618a, 618b, 618c, 618d having an active aerosurface 620a, 620b, 620c, 620d that is controlled by an active aerosurface control module of a flight control system. During various flight operations, active aerosurfaces 620a, 620b, 620c, 620d may operate as vertical stabilizers, horizontal stabilizers, rudders and/or elevators to selectively provide pitch control and yaw control to aircraft 600.

Aircraft 600 includes landing gear depicted as wheels 622a, 622b, 622c, 622d. The landing gear may be passively operated pneumatic landing struts or actively operated telescoping landing struts disposed within tail assemblies 618a, 618b, 618c, 618d of propulsion assemblies 612a, 612b, 612c, 612d. Wheels 622a, 622b, 622c, 622d enable aircraft 600 to taxi and perform other ground maneuvers. The landing gear may provide a passive brake system or may include active brakes such as an electromechanical braking system or a manual braking system to facilitate parking as required during ground operations and/or passenger ingress and egress.

Any of the airfoil or non-airfoil components of aircraft 600 may be formed using an additively manufactured flyaway tool as described in the illustrative embodiments. For example, airframe 602, wings 604, 606, pylons 608, 610, propulsion assemblies 612a, 612b, 612c, 612d, nacelles 614a, 614b, 614c, 614d, proprotors 616a, 616b, 616c, 616d, tail assemblies 618a, 618b, 618c, 618d, aerosurfaces 620a, 620b, 620c, 620d or wheels 622a, 622b, 622c, 622d may be formed, or include portions formed, using an additively manufactured flyaway tool. The use of additively manufactured flyaway tools on tiltrotor aircraft 400, unmanned aerial system 500 and aircraft 600 in FIGS. 5A-5B, 6A-6B and 7A-7B demonstrate the wide variety of aircraft types on which the illustrative embodiments may be implemented. In other embodiments, additively manufactured flyaway tools may be used to manufacture wing tips, wing tip caps or canards on any type of aircraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An airfoil component assembly for an aircraft comprising:
    an additively manufactured flyaway tool including an infill support core formed from fiber-reinforced polymer and an interface sheet surrounding the infill support core, the interface sheet integral with the infill support core and having a different density than the infill support core;
    a spar formed from one or more layers of composite material disposed on the interface sheet of the flyaway tool; and
    a skin formed from one or more layers of composite material disposed on the spar and the interface sheet of the flyaway tool;
    wherein the flyaway tool, the spar and the skin form the airfoil component assembly for use by the aircraft in flight.

2. The airfoil component assembly as recited in claim 1 wherein the flyaway tool forms an inner mold line tool.

3. The airfoil component assembly as recited in claim 1 wherein the flyaway tool is formed from a plurality of flyaway tool segments.

4. The airfoil component assembly as recited in claim 1 wherein the flyaway tool further comprises a 3D printed flyaway tool.

5. The airfoil component assembly as recited in claim 1 wherein the infill support core forms a polygonal pattern.

6. The airfoil component assembly as recited in claim 1 wherein a forward edge of the flyaway tool forms a spar indentation and wherein the spar is disposed on the spar indentation.

7. The airfoil component assembly as recited in claim 1 wherein the infill support core forms an organic pattern.

8. The airfoil component assembly as recited in claim 3 wherein the plurality of flyaway tool segments comprise interlocking flyaway tool segments.

9. An aircraft comprising:
    a fuselage; and
    an airfoil component assembly comprising:
        an additively manufactured flyaway tool including an infill support core formed from fiber-reinforced polymer and an interface sheet surrounding the infill support core, the interface sheet integral with the infill support core and having a different density than the infill support core;
        a spar formed from one or more layers of composite material disposed on the interface sheet of the flyaway tool; and
        a skin formed from one or more layers of composite material disposed on the spar and the interface sheet of the flyaway tool;
        wherein the flyaway tool, the spar and the skin form the airfoil component assembly for use by the aircraft in flight.

10. The aircraft as recited in claim 9 wherein the airfoil component assembly further comprises a wing.

11. The aircraft as recited in claim 9 wherein the airfoil component assembly further comprises a rotor blade selected from the group consisting of a main rotor blade or a tail rotor blade.

12. The aircraft as recited in claim 9 wherein the airfoil component assembly further comprises a stabilizer selected from the group consisting of a horizontal stabilizer or a vertical stabilizer.

13. The aircraft as recited in claim 9 wherein the airfoil component assembly further comprises a control surface selected from the group consisting of an elevator or a rudder.

14. The aircraft as recited in claim 9 wherein the airfoil component assembly further comprises a pylon.

15. The aircraft as recited in claim 9 wherein the flyaway tool forms an inner mold line tool.

16. The aircraft as recited in claim 9 wherein the flyaway tool is formed from a plurality of flyaway tool segments.

17. The aircraft as recited in claim 9 wherein the flyaway tool further comprises a 3D printed flyaway tool.

18. The aircraft as recited in claim 9 wherein the infill support core forms a polygonal pattern.

19. The aircraft as recited in claim 9 wherein the infill support core forms an organic pattern.

20. The aircraft as recited in claim 16 wherein the plurality of flyaway tool segments comprise interlocking flyaway tool segments.

* * * * *